United States Patent
McFerren et al.

[11] Patent Number: 5,992,811
[45] Date of Patent: Nov. 30, 1999

[54] CLAMP FOR SECURING DEVICES

[76] Inventors: Steven A. McFerren, 11139 Bramblebush St., Tampa, Fla. 33624; Eugene W. Durand, 4619 Van Dyke Rd., Lutz, Fla. 33549

[21] Appl. No.: 09/028,068

[22] Filed: Feb. 23, 1998

[51] Int. Cl.[6] .................................................. A47G 1/10
[52] U.S. Cl. ........................... 248/316.3; 248/113
[58] Field of Search ................ 248/316.3, 316.2, 248/316.1, 113, 110

[56] References Cited

U.S. PATENT DOCUMENTS

| | | |
|---|---|---|
| 198,714 | 12/1877 | Uibel . |
| 1,486,762 | 3/1924 | Jones ........................... 248/113 |
| 1,552,252 | 9/1925 | Webb . |
| 1,646,068 | 10/1927 | Rosner . |
| 1,666,045 | 4/1928 | Ganny et al. . |
| 1,798,028 | 3/1931 | Nachtigal . |
| 1,911,781 | 5/1933 | Wolfe, Jr. . |
| 1,925,767 | 9/1933 | Mallory . |
| 1,965,973 | 7/1934 | Brown . |
| 1,968,462 | 7/1934 | Merhell . |
| 2,056,878 | 10/1936 | Wineholt . |
| 2,344,816 | 3/1944 | Hahn . |
| 2,379,060 | 6/1945 | Bacheldor . |
| 2,452,727 | 11/1948 | Burton . |
| 2,909,347 | 10/1959 | Bass . |
| 4,134,499 | 1/1979 | Joswig ........................... 248/316.3 X |
| 4,455,720 | 6/1984 | Sutton . |
| 4,505,493 | 3/1985 | Gustavsson . |
| 4,834,352 | 5/1989 | Thornton . |
| 4,943,039 | 7/1990 | Jackson . |
| 5,022,125 | 6/1991 | Biass . |

*Primary Examiner*—Ramon O. Ramirez
*Attorney, Agent, or Firm*—Stein, Schifino & Van Der Wall

[57] ABSTRACT

An adjustable tension clamp for securing a secondary lawn care device to a primary lawn care device comprising: a substantially u-shaped body; a first bracket; a first pair of parallel disposed rollers; a first journalled means for connecting said first pair of rollers in said first bracket; and a first securing means for connecting said first bracket to one side of said body whereby said secondary lawn care device may be frictionally held between said first pair of rollers and said side of said body.

18 Claims, 6 Drawing Sheets

CLAMP FOR SECURING DEVICES

BACKGROUND OF THE INVENTION

1. Field of the Invention

This invention relates to a device mounting apparatus, and in particular a clamp to secure lawn care instruments to a lawnmower.

2. Description of the Background Art

In order to properly maintain a lawn, it is necessary to use several tools. A lawn mower is the primary care tool used to maintain a lawn. After using the lawn mower on the entire landscape, the person maintaining the lawn has to return to a tool shed, trailer or other storage area to acquire the next lawn care instrument for the designated application. For instance a line-trimmer or stick edger would be necessary to maintain an area that is not accessible to the lawn mower. Therefore, it is desirable to be able to locate a line-trimmer or similar device on a walk-behind or rider type lawn mower for the convenience of the person maintaining the lawn.

A device that could be used by the person maintaining the lawn to secure the proper lawn care instrument in the vicinity of the work site is a portable wheeled cart. The cart allows the person maintaining the lawn to bring one or more tools to the work site. However, the cart requires the user to transport the cart separately from the lawn mower thereby requiring an extra trip by the individual to bring the needed tool to the work site.

A wide variety of devices are available for holding articles such as brooms, shovels and the like in suspension through the use of arms which have a frictional, clamping or wedging engagement with the handle of the article. Typically, these devices have been employed in storage areas such as closets, garages and basements.

Prior hereto, however, there has been a lack of appreciation to aid the person maintaining the lawn by providing a clamp that could be employed by a primary lawn care device to transport a secondary lawn care device.

It is therefore an object of the present invention to provide a clamp that can be secured to a primary lawn care device to transport a secondary lawn care device.

This clamp must provide an easy and accessible means of securing one lawn care device to another lawn care device. Inasmuch as the art consists of various types of clamps for securing articles in a storage area, it can be appreciated that there is a continuing need for and interest in improvements to clamps for securing devices to different instruments, and in this respect, the present invention addresses these needs and interests.

Therefore, the principal object of this invention is to provide a clamp that can be used by a lawn maintenance person to reduce the number of trips necessary to a storage area for the appropriate lawn care device.

Another object of this invention is to provide a clamp that easily secures the lawn care device without damaging said lawn care device, yet holds said lawn care device securely enough so as not to dislodge it during mower use.

Yet still another object of the present invention is to provide a clamp that easily releases the lawn care device when said lawn care device is pulled upon by the lawn maintenance person.

Still another object of the present invention is to provide a clamp that can be oriented in different positions in order to obtain the proper alignment for securing the lawn care device.

Another object of this invention is to provide a clamp that can be secured to a lawn mower by the means of a bolt.

Yet still another object of the present invention is to provide a clamp that employs a u-shaped body as the means of providing the opposing force to securely hold a lawn care device.

Yet another object of the present invention is to provide a clamp that employs a u-shaped body that is made of cold-rolled sprung steel.

Another object of this invention is to provide a clamp with at least one pair of rollers that are substantially parallel.

Yet still another object of this invention is to provide a clamp with at least one pair of rollers that are attached to a bracket which can be oriented to obtain the proper alignment for holding the secondary lawn care device.

Yet another object of the present invention is to provide a clamp where one pair of rollers are journalled through the insertion of the lawn care device into the clamp by the lawn maintenance person.

Yet still another object of the present invention is to provide a clamp where two pairs of rollers are journalled through the insertion of the lawn care device into the clamp by the lawn maintenance person.

Another object of this invention is to provide an extension bracket which can be connected to the primary lawn care device at one end and to the clamp at an opposite end.

Yet another object of this invention is to provide an extension bracket having a plurality of connection sites for attaching one or more clamps and said extension bracket can be connected at an end to the primary lawn care device.

Yet still another object of this invention is to provide a clamp comprising: a substantially u-shaped body; a first bracket; a first pair of parallel disposed rollers; a first journalled means for connecting said first pair of rollers in said first bracket; and a first securing means for connecting said first bracket to one side of said body whereby said secondary lawn care device may be frictionally held between said first pair of rollers and said side of said body.

Yet still another object of the present invention is to provide adjustability of distance between the pairs of rollers to allow for a variety of tensions of the grip of said lawn care device and/or to allow for varying thicknesses and shapes of lawn care device handles and shafts.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. This invention satisfies the need for a device to easily secure a secondary lawn care tool to a primary lawn care tool.

For the purpose of summarizing this invention, this invention comprises a substantially u-shaped body. A first bracket containing a first pair of parallel disposed rollers is attached to one side of the body. A secondary lawn care device is inserted into the clamp whereby the secondary lawn care device is frictionally held between the first pair of rollers and the opposing side of the body.

Therefore, it can be readily seen that the present invention provides a device that can easily secure a secondary lawn care tool to a primary lawn care tool. Thus, a device to easily secure a secondary lawn care tool to a primary lawn care tool provides capabilities that would be appreciated.

The foregoing has outlined rather broadly, the more pertinent and important features of the present invention. The detailed description of the invention that follows is offered so that the present contribution to the art can be more fully appreciated. Additional features of the invention will be described hereinafter. It should be appreciated by those skilled in the art that the conception and the disclosed specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompany drawings in which.

Similar reference characters refer to similar parts throughout the several views of the drawings

DESCRIPTION OF THE PREFERRED EMBODIMENT

Figure 1:
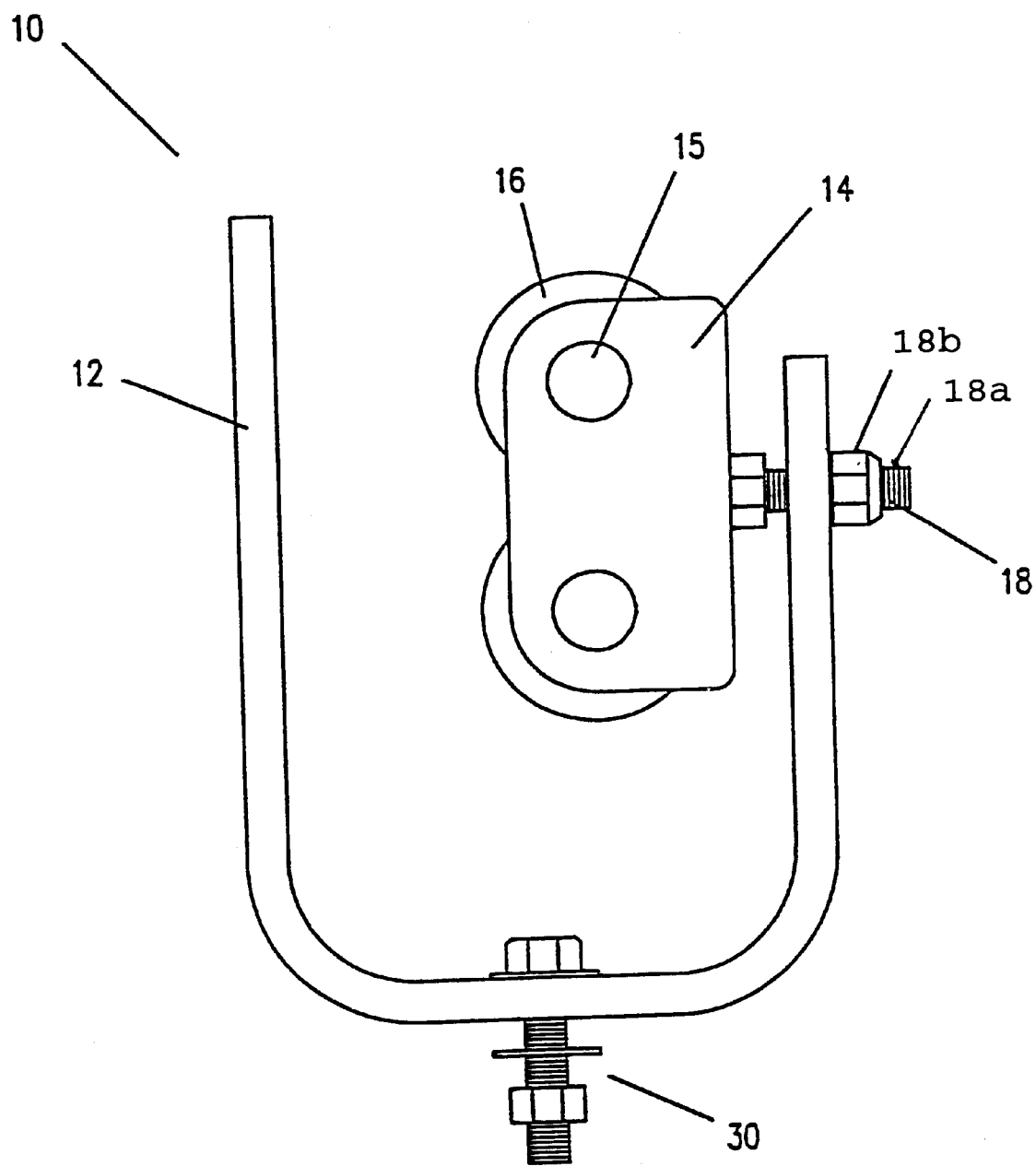
FIG. 1 is a front view of the first embodiment of the clamp for securing lawn care devices.
Figure 5:
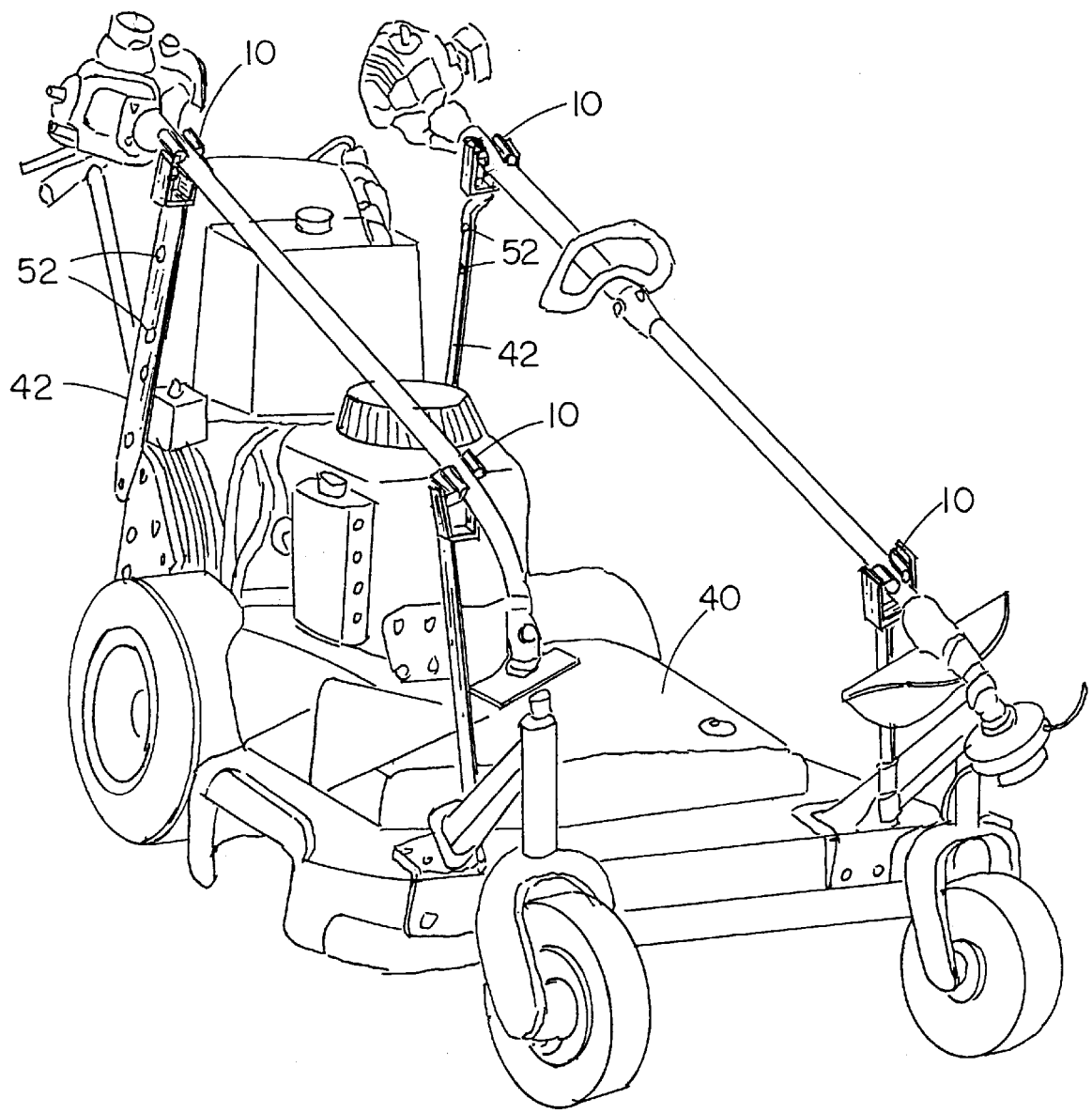
FIG. 5 is a perspective view of a plurality of clamps for securing lawn care devices attached to a primary lawn care device.

With reference to the drawings, FIG. 1 shows the first embodiment of the clamp 10 for securing lawn care devices. The clamp 10 has a substantially u-shaped body 12 that provides the main frame for the clamp 10. The body 12 has a first bracket 14 attached by a first securing means 18. The first bracket 14 contains a first pair of parallel disposed rollers 16. A first journalled means 15 is provided for said first bracket 14 to allow rotation of said first pair of rollers 16. The ability of said first bracket 14 to rotate upon said first securing means 18 allows the user to obtain the desired orientation of the secondary lawn care device when it is placed within said clamp 10. The fastening means 30 is shown at the bottom of said body 12 to allow said clamp 10 to be attached to a primary lawn care device 40 as shown in FIG. 5.

Figure 3:
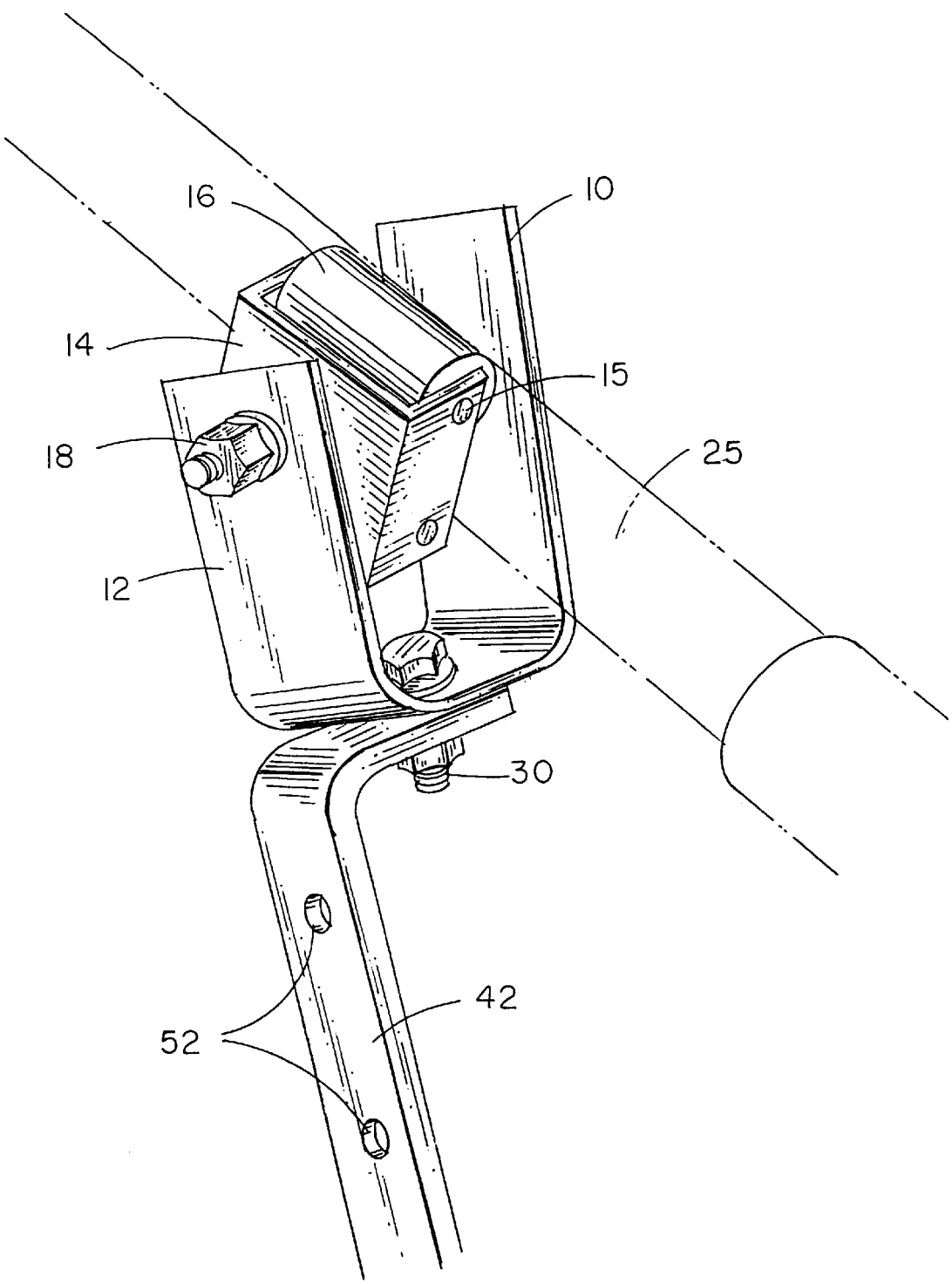
FIG. 3 is a perspective view of the first embodiment of the clamp for securing lawn care devices showing a shaft from the secondary lawn care device positioned within said clamp and said clamp being connected to an extension bracket.

As best shown in FIG. 3, the first embodiment of the clamp 10 allows a lawn care maintenance person to easily insert a shaft 25 of a secondary lawn care device in between one side of said body 12 and said first pair of rollers 16 whereby said shaft 25 of said secondary lawn care device is frictionally held in place. The clamp 10 functions when a secondary lawn care device, such as a line-trimmer, is inserted in between said first pair of rollers 16 and said body 12. Said first pair of rollers are journalled upon said first journalled means 15 by the insertion of said shaft 25 of said line-trimmer. The body 12 urges the first bracket 14 towards the opposing end of said body 12. Therefore, opposing forces exert pressure on said shaft 25 of said line-trimmer thereby securely holding the line-trimmer in place. In addition, said first pair of rollers 16 provide a frictional force to hold said shaft 25 of said line-trimmer in a fixed position within the clamp 10.

Figure 2:
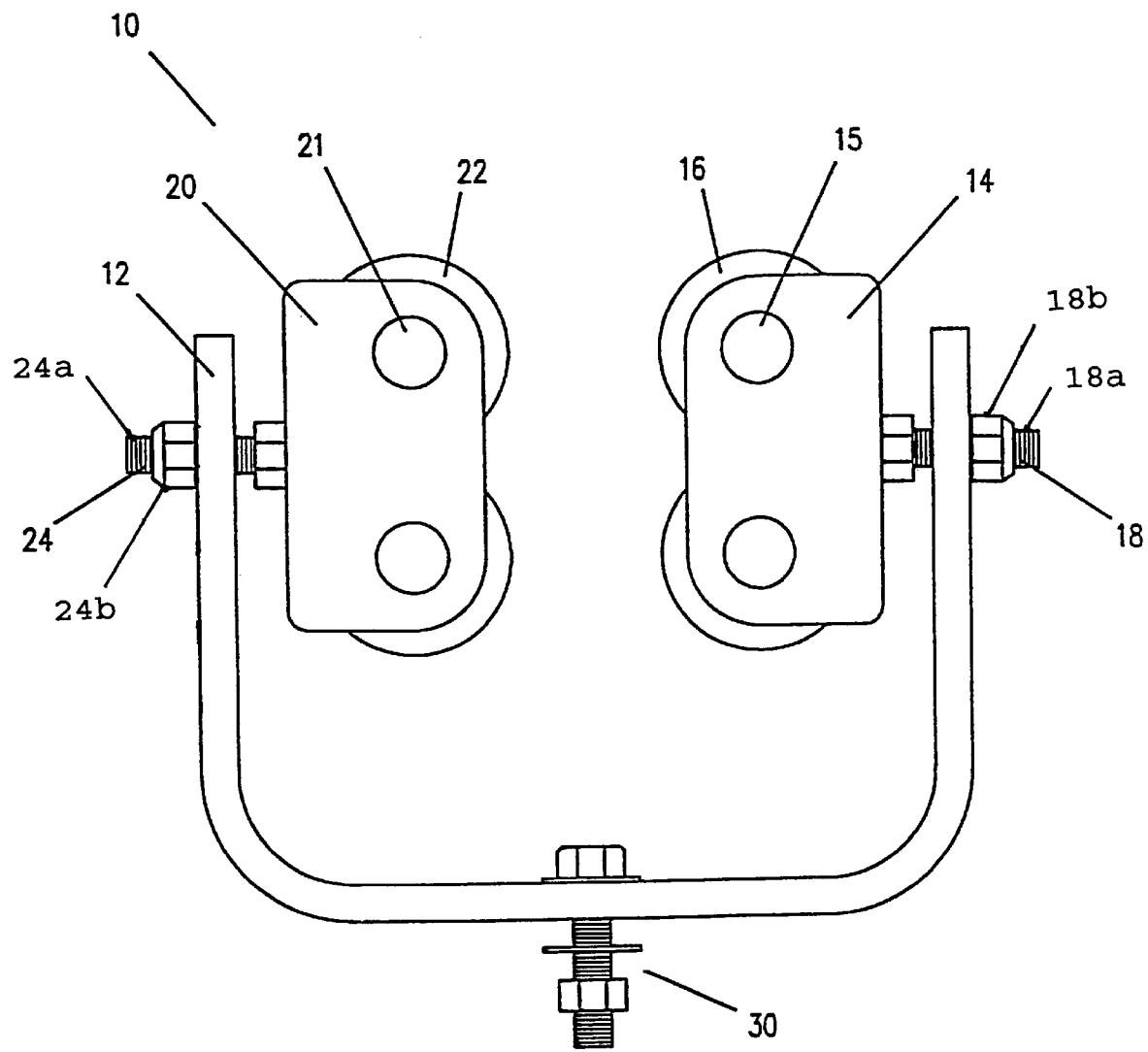
FIG. 2 is a front view of the second embodiment of the clamp for securing lawn care devices.

The second embodiment is best shown in FIG. 2. The clamp 10 has a substantially u-shaped body 12 that provides the main frame for the clamp 10. The body 12 has a first bracket 14 attached by a first securing means 18. The first bracket 14 contains a first pair of parallel disposed rollers 16. On the opposite side of said first bracket 14 is a second bracket 20 which is attached to the opposing end of said body 12 by a second securing means 24. Said second bracket 20 contains a second pair of parallel disposed rollers 22. A first journalled means 15 is provided for said first bracket 14 to allow rotation of said first pair of rollers 16. A second journalled means 21 is provided for said second bracket 20 to allow rotation of said second pair of rollers 22. The ability of said first bracket 14 to rotate upon said first securing means 18 and the ability of said second bracket 20 to rotate upon said second securing means 24 allows the user to obtain the desired orientation of the secondary lawn care device when it is placed within said clamp 10. Also shown in FIG. 2 is a fastening means 30 positioned at the bottom of said body 12 to allow said clamp 10 to be attached to a primary lawn care device as shown in FIG. 5.

Figure 4:
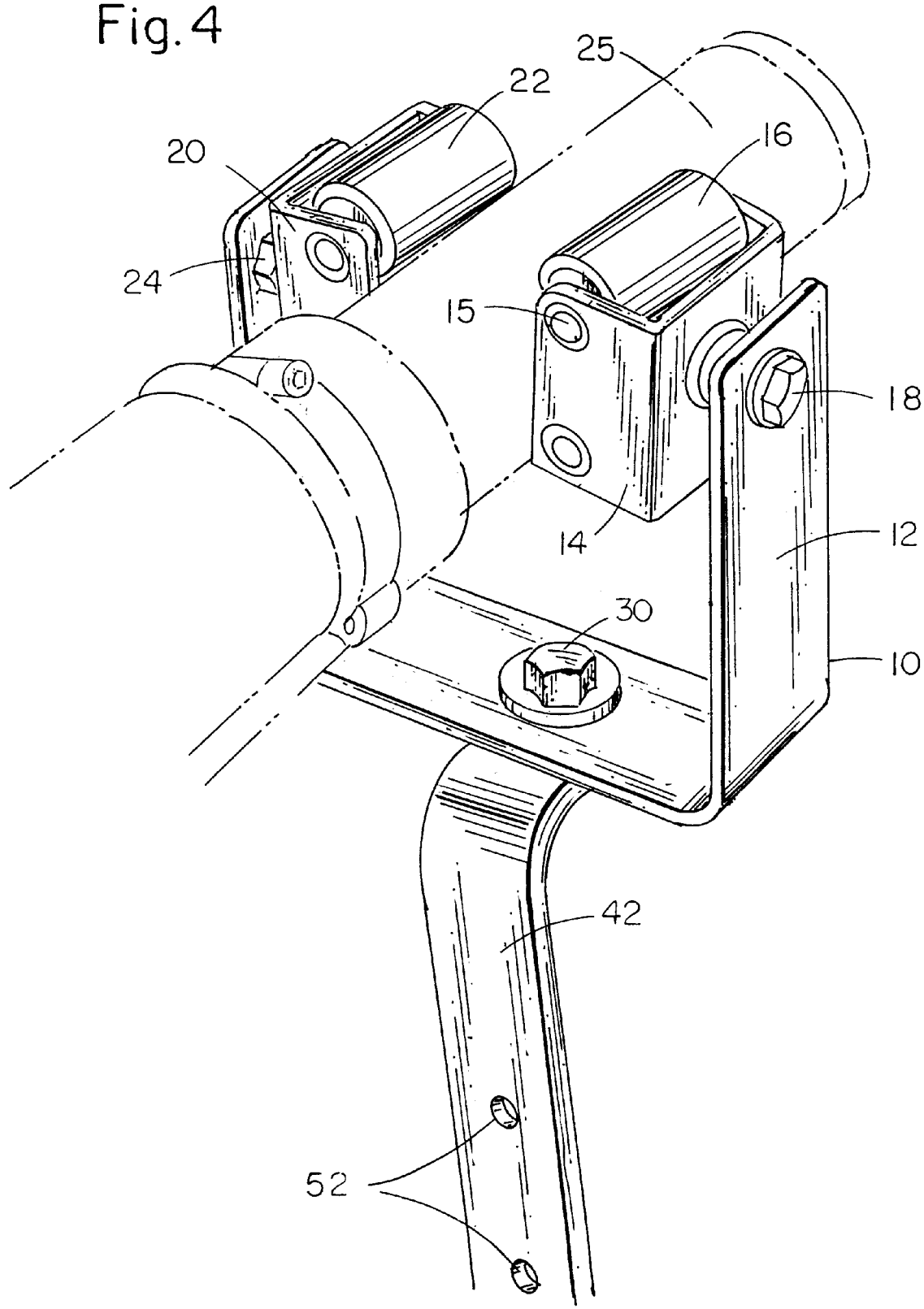
FIG. 4 is a perspective view of the second embodiment of the clamp for securing lawn care devices showing a shaft from the secondary lawn care device positioned within said clamp and said clamp being connected to an extension bracket.

As best shown in FIG. 4, the second embodiment of the clamp 10 allows a lawn care maintenance person to easily insert a shaft 25 of a secondary lawn care device in between said first pair of rollers 16 and said second pair of rollers 22 whereby said shaft 25 of said secondary lawn care device is frictionally held in place by both sets of rollers 16,22. The clamp 10 functions when said shaft 25 of said secondary lawn care device, such as a line-trimmer, is inserted in between said first pair of rollers 16 and said second pair of rollers 22. Said first pair of rollers 16 are journalled upon said first journalled means 15 and said second pair of rollers 22 are journalled upon said second journalled means 21 which are both respectively journalled by the insertion of said shaft 25 of said line-trimmer. The body 12 urges said first bracket 14 towards the opposing end of said body 12 where said second bracket 20 is located. Therefore, opposing forces exert pressure on said shaft 25 of said line-trimmer thereby securely holding said line-trimmer in place. In addition, said first pair of rollers 16 and said second pair of rollers 22 each provide a frictional force to hold said shaft 25 of said line-trimmer in a fixed position within the clamp 10.

FIG. 5 shows possible locations for attaching the clamp 10 of the invention to a primary lawn care device such as a walk behind mower 40. The clamp 10 is shown attached to existing metal braces and square tubing through the use of the fastening means 30 attached to L-brackets 42. Other positions on the walk behind mower 40 are possible as long as there is sufficient clearance to adapt the fastening means 30 to either the L-bracket 42 or directly to the mower 40. The clamp 10 is adjustable in orientation relative to the fastening means 30 to allow the fastening means 30 to attach almost anywhere upon the mower 40 through the use of L-brackets 42.

Figure 6:
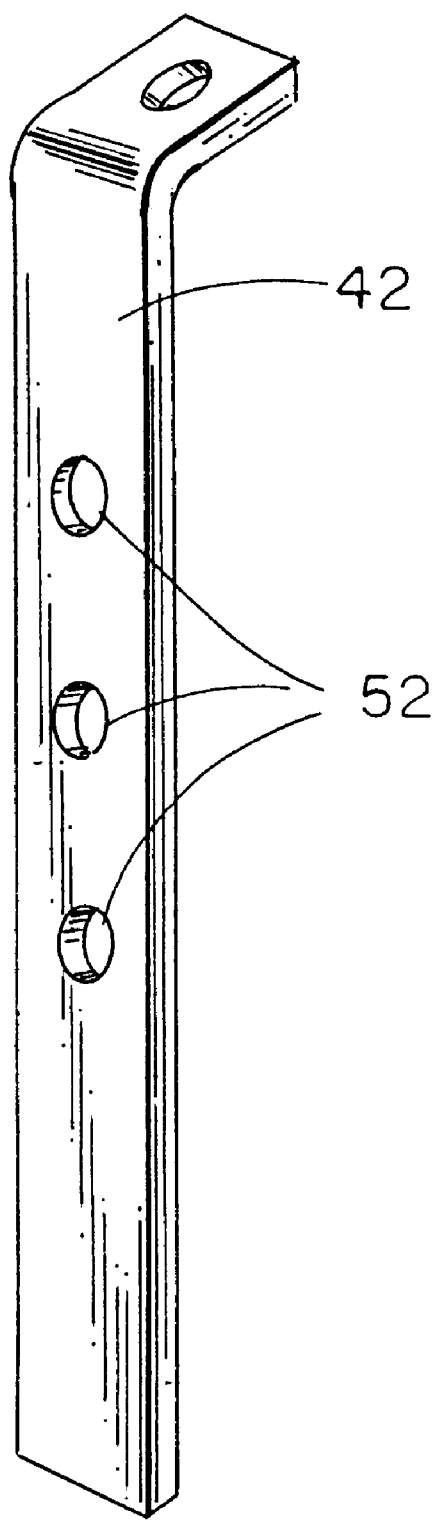
FIG. 6 is a perspective view of an extension bracket for attaching between the clamp and the primary care device.

Referring to FIG. 6, an extension L-bracket 42 is shown. Said L-bracket 42 has a plurality of connection sites 52 for attaching the clamp 10 of the present invention to said extension bracket 42. Said extension bracket 42 is attached at an end to a primary lawn care device. The remaining connection sites 52 can be used for multiple clamps 10, to locate a clamp 10 for ease of access or for clearance when the secondary lawn care device is placed within said clamp 10.

Similar reference characters refer to similar parts throughout the several views of the drawings.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. An adjustable tension clamp for securing a secondary lawn care device to a primary lawn care device comprising:
   a substantially u-shaped body;
   a first bracket;
   a first pair of parallel disposed rollers;
   a first journalled means for connecting said first pair of rollers in said first bracket; and
   a first securing means for connecting said first bracket to one side of said body whereby said secondary lawn care device may be frictionally held between said first pair of rollers and said side of said body.

2. The adjustable tension clamp of claim 1, wherein said first bracket being rotatably connected to said side of said body through said first securing means whereby said first bracket may be oriented at different angles to allow the proper alignment of said secondary lawn care device.

3. The adjustable tension clamp of claim 2, wherein said first securing means is a first bolt whereby said first bracket can be positioned at different distances from said side of said body.

4. The adjustable tension clamp of claim 1, wherein said body is made of cold-rolled sprung steel.

5. The adjustable tension clamp of claim 1, further comprising a fastening means whereby said clamp can be fastened to said primary lawn care device.

6. The adjustable tension clamp of claim 5, wherein said fastening means is a second bolt whereby said clamp may be aligned to allow the proper placement of said secondary lawn care device.

7. The adjustable tension clamp of claim 6, further comprising an extension bracket for securing said clamp to said primary lawn care device, said bracket connected at a first end to said second bolt of said clamp and adapted to be connected at its second end to said primary lawn care device.

8. The adjustable tension clamp of claim 7, where in said extension bracket further having a plurality of connection sites allowing said clamp to be positioned at different distances along the length of said extension bracket.

9. The adjustable tension clamp of claim 8, wherein said extension bracket is capable of securing a plurality of clamps.

10. An adjustable tension clamp for securing a secondary lawn care device to a primary lawn care device comprising:
    a substantially u-shaped body;
    a first bracket;
    a first pair of parallel disposed rollers;
    a first journalled means for connecting said first pair of rollers in said first bracket;
    a first securing means for connecting said first bracket to one side of said body;
    a second bracket;
    a second pair of parallel disposed rollers;
    a second journalled means for connecting said second pair of rollers in said second bracket; and
    a second securing means for connecting said second bracket to an opposing side of said body whereby said secondary lawn care device may be frictionally held between said first pair of rollers and said second pair of rollers.

11. The adjustable tension clamp of claim 10, wherein said first bracket being rotatably connected to said side of said body through said first securing means and said second bracket being rotatably connected to said opposing side of said body through said second securing means whereby both said first bracket and said second bracket may be respectively oriented at different angles to allow the proper alignment of said secondary lawn care device.

12. The adjustable tension clamp of claim 11, wherein said first securing means is a first bolt and said second securing means is a second bolt whereby said first bracket can be positioned at different distances from said side of said body and said second bracket can be positioned at different distances from said opposing side of said body.

13. The adjustable tension clamp of claim 10, wherein said body is made of cold-rolled sprung steel.

14. The adjustable tension clamp of claim 10, further comprising a fastening means whereby said clamp can be fastened to said primary lawn care device.

15. The adjustable tension clamp of claim 14, wherein said fastening means is a third bolt whereby said clamp may be aligned to allow the proper placement of said secondary lawn care device.

16. The adjustable tension clamp of claim 15, further comprising an extension bracket for securing said clamp to said primary lawn care device, said bracket connected at a first end to said third bolt of said clamp and adapted to be connected at its second end to said primary lawn care device.

17. The adjustable tension clamp of claim 16, wherein said extension bracket further having a plurality of connection sites allowing said clamp to be positioned at different distances along the length of said extension bracket.

18. The adjustable tension clamp of claim 17, wherein said extension bracket is capable of securing a plurality of clamps.

* * * * *

UNITED STATES PATENT AND TRADEMARK OFFICE
CERTIFICATE OF CORRECTION

PATENT NO. : 5,992,811
DATED : Nov. 30, 1999
INVENTOR(S) : Steven A. Mc Ferren; Eugene W. Durand It is certified that error appears in the above-identified patent and that said Letters Patent is hereby corrected as shown below:

Col. 3, Line 64, after "10.",
insert --Further, securing means 18 can
be a threaded bolt 18a with a nut 18b for
tightening. The threaded bolt 18a can be
tighten at different positions along its
length. This allows first bracket 14 to be
positioned at different distances from the body 12.--
Col. 4, Line 35, after "10.",
insert --Further, first securing means 18 can
be a threaded bolt 18a with a nut 18b for
tightening and second securing means 24 can be
a threaded bolt 24a with a nut 24b for tightening.
The threaded bolts 18a and 24a can both be tighten
at different positions along their respective lengths.
Thus, said first bracket 14 can be positioned at
different distances from one side of the body 12 and
said second bracket 20 can be positioned at
different distances from said opposing side of
the body 12.--
Col. 6, Line 1, Delete "where in" and
insert --wherein--.

Signed and Sealed this

First Day of August, 2000

*Attest:*

Q. TODD DICKINSON

*Attesting Officer*  *Director of Patents and Trademarks*